(12) United States Patent
Srinivasan

(10) Patent No.: US 8,982,841 B2
(45) Date of Patent: Mar. 17, 2015

(54) LONG TERM EVOLUTION ARCHITECTURE AND MOBILITY

(71) Applicant: SpiderCloud Wireless, Inc., San Jose, CA (US)

(72) Inventor: Murari Srinivasan, Palo Alto, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 191 days.

(21) Appl. No.: 13/663,297

(22) Filed: Oct. 29, 2012

(65) Prior Publication Data

US 2013/0294403 A1 Nov. 7, 2013

Related U.S. Application Data

(60) Provisional application No. 61/552,421, filed on Oct. 27, 2011.

(51) Int. Cl.
*H04W 36/16* (2009.01)
*H04W 88/12* (2009.01)
*H04W 8/08* (2009.01)
*H04W 36/08* (2009.01)
*H04W 92/04* (2009.01)

(52) U.S. Cl.
CPC ............ *H04W 36/165* (2013.01); *H04W 88/12* (2013.01); *H04W 8/082* (2013.01); *H04W 36/08* (2013.01); *H04W 92/045* (2013.01)
USPC .......................................................... 370/331

(58) Field of Classification Search
CPC ... H04W 36/08; H04W 36/16; H04W 36/165; H04W 92/12
USPC .......................................................... 370/331
See application file for complete search history.

(56) References Cited

U.S. PATENT DOCUMENTS

| | | | |
|---|---|---|---|
| 2009/0109925 A1* | 4/2009 | Nakamura et al. ............ | 370/331 |
| 2010/0054207 A1* | 3/2010 | Gupta et al. .................. | 370/331 |
| 2010/0142397 A1* | 6/2010 | Arye .............. | 370/252 |
| 2012/0044876 A1* | 2/2012 | Taaghol ........................ | 370/329 |
| 2012/0089845 A1* | 4/2012 | Raleigh ........................ | 713/176 |
| 2012/0113794 A1* | 5/2012 | Roman et al. ................. | 370/201 |
| 2014/0036722 A1* | 2/2014 | Giloh et al. ................... | 370/254 |
| 2014/0080492 A1* | 3/2014 | Shoshan et al. ............... | 455/449 |

* cited by examiner

*Primary Examiner* — Min Jung
(74) *Attorney, Agent, or Firm* — TechLaw LLP

(57) ABSTRACT

A services node (SN) is provided that functions as a local, premise-based gateway that anchors and aggregates a group of radio nodes (RNs). Accordingly, the SN absorbs the functionalities of conventional mobility management entities (MMEs), as well as serving and packet data network gateways, where the SN appears as a single virtual eNB to a macrocellular core network. As a result, complexity associated with aggregating and controlling a large number of RNs (performed by the SN) is hidden from the core network. Additionally, micro-mobility between individual RNs controlled by an SN is completely handled at a local enterprise gateway level, thus significantly reducing mobility-related signaling from impacting an MME pool in the code network. Moreover local data offloading is made possible via the SN.

24 Claims, 13 Drawing Sheets

US 8,982,841 B2

LONG TERM EVOLUTION ARCHITECTURE AND MOBILITY

RELATED APPLICATIONS

This applications claims priority under 35 U.S.C. §119(e) to U.S. Provisional Patent Application Ser. No. 61/552,421, titled "LONG TERM EVOLUTION ARCHITECTURE AND MOBILITY" and filed Oct. 27, 2011, which is hereby incorporated by reference in its entirety and for all purposes.

TECHNICAL FIELD

The present invention relates to communication networks, and more particularly, to mapping a $3^{rd}$ Generation Partnership Project (3GPP) Long Term Evolution (LTE) architecture onto underlay local area Radio Access Network (RAN) technology and embedding an LTE RAN into a LTE macrocellular network.

BACKGROUND

FIG. 1 illustrates a high-level LTE network architecture where control plane and user plane traffic are separated. In this architecture, a core network, referred to as an Evolved Packet Core (EPC), may be composed of control and user-plane entities. The main control plane entity is referred to as a Mobility Management Entity (MME), while user plane traffic is handled by a Serving Gateway (SGW) and a Packet Data Network (PDN) Gateway (PDN GW or PGW). The PDN GW is the interface between the LTE networking subsystem and IP networks, including the public Internet, and Internet Protocol Multimedia Subsystem (IMS) services 130 that may be deployed within an Operator Core. FIG. 1 further illustrates an MME Pool 100 as comprising a plurality of MMEs, an SGW Pool 110 as comprising a plurality of SGWs, and a PDN GW Pool 120 comprising a plurality of PDN GWs. It should be noted that the number of MMEs, SGWs, and/or PDN GWs may be varied in accordance with different embodiments.

User authentication is handled through a Home Subscriber Server (HSS) 140, which is analogous to a home location register (HLR) in third generation (3G)/Global System for Mobile Communications (GSM) systems. An entity referred to as a Policy and Charging Rules Function (PCRF) 150 is responsible for tying quality of service (QoS) policies and billing mechanisms into a single cohesive framework.

Base stations 160a and 106b are referred to as evolved Node Bs (eNBs), and are linked to MMEs, such as those in MME Pool 100, using an S1-MME (also known as S1-C) interface. The eNBs 160a and 106b are linked to the SGWs, such as those in SGW Pool 110, using an S1-U interface. Such an S1-Flex mechanism (creating pools of MMEs and SGWs and allow eNBs to be connected to MMEs and SGWs in a pool) allows an eNB, e.g., eNB 160a or 106b, to connect to a pool of MMEs 100 and a pool of SGWs 110 for load balancing purposes.

FIG. 1 further illustrates various interface connections between the aforementioned LTE elements, i.e., S6a, Gx, S5/S8 and S11 interface connections. Different users served by a single eNB may be associated with different MMEs and SGWs. An eNB is roughly analogous to the combination of a node B and a radio network controller (RNC) in Universal Mobile Telecommunications System (UMTS) networks. A substantial difference from 3GPP UMTS systems is the flattened LTE architecture, which also utilizes a direct X2 interface between eNBs. Handover is initiated and handled directly between eNBs in the LTE architecture with the MMEs only playing an auxiliary role for user equipment (UE) tracking purposes.

SUMMARY

Various aspects of examples of the invention are set out in the claims.

According to a first aspect of the present invention, a method of implementing a local radio access network (RAN), comprises: aggregating communications interfaces between a plurality of radio nodes and a packet core network through an aggregation node; controlling user equipment mobility associated with at least one of the plurality of radio nodes; and acting as a virtual enhanced NodeB (eNB) to the packet core network.

According to a second aspect of the present invention, a computer program product is embodied on a computer-readable non-transitory medium and comprises computer code for aggregating communications interfaces between a plurality of radio nodes and a packet core network through an aggregation node; computer code for controlling user equipment mobility associated with at least one of the plurality of radio nodes; and computer code for acting as a virtual enhanced NodeB (eNB) to the packet core network.

According to a third aspect of the present invention, a system comprises: a local radio access network (RAN) comprising a plurality of radio nodes; and a packet core network communicatively connected to the plurality of radio nodes via a service node (SN) comprising at least an SN mobility entity. The SN mobility entity is configured to: aggregate communications interfaces between the plurality of radio nodes and the packet core network; control user equipment mobility associated with at least one of the plurality of radio nodes; and act as a virtual enhanced NodeB (eNB) to the packet core network.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

A Services Node (SN) in accordance with various embodiments refers to an "aggregation node" that may be implemented as an enterprise premise-based controller element that coordinates a group of radio nodes (RNs). In one embodiment, the SN is a UMTS Radio Network/Node Controller (RNC) and a policy-based Internet Protocol (IP) edge router combined into one platform. Alternatively, the SN may be implemented as a cloud-based aggregation node.

In an LTE embodiment, the SN functions as a local, premise-based gateway that anchors and aggregates a group of LTE RNs. Accordingly, the SN absorbs the functionalities of an MME, as well as an SGW/PDN GW combination. However, it should be noted that the SN need not embody complete MME functionality. Moreover, the SN need not appear as an MME to the EPC. The combination of a local SGW/PDN GW is referred to as a local gateway (LGW) in 3GPP Release 10+ specifications and is an element associated with local data offload.

Figure 2:
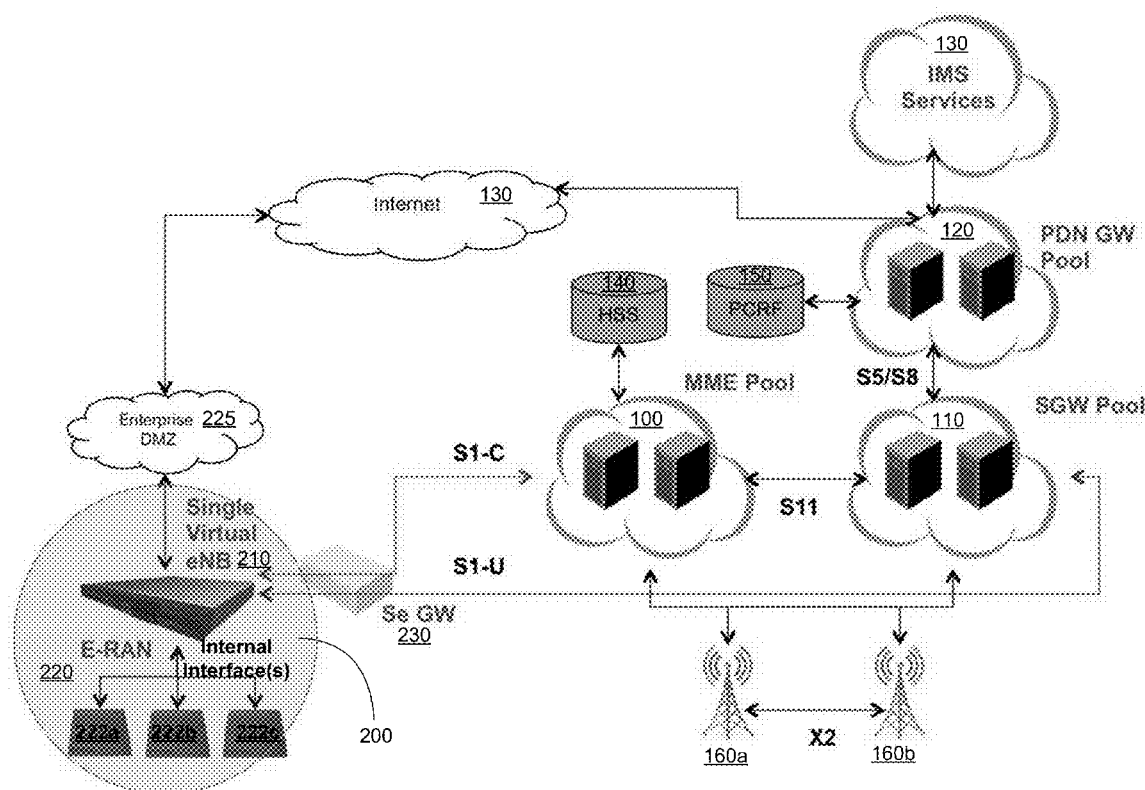
FIG. 2 is an exemplary LTE local RAN embedded into a macrocellular LTE network architecture in accordance with an embodiment of the present invention.

In terms of "northbound" interfaces, the SN presents itself as a single virtual eNB to the EPC, and runs aggregated S1-MME and S1-U connections to MME and SGW pools, respectively. FIG. 2 illustrates such an integration architecture, where utilization of an SN 200 in accordance with various embodiments masks the complexity of running internal interface connections (e.g., S1 interfaces) to each RN (e.g., RNs 222a, 222b, and 222c of a local RAN/ERAN) under its control. It should be noted that throughout this specification, the term "ERAN" may be used to refer to any local area network that is deployed in conjunction with a macrocellular network, either on the same frequency, or deployed in a distinct frequency.

Figure 1:
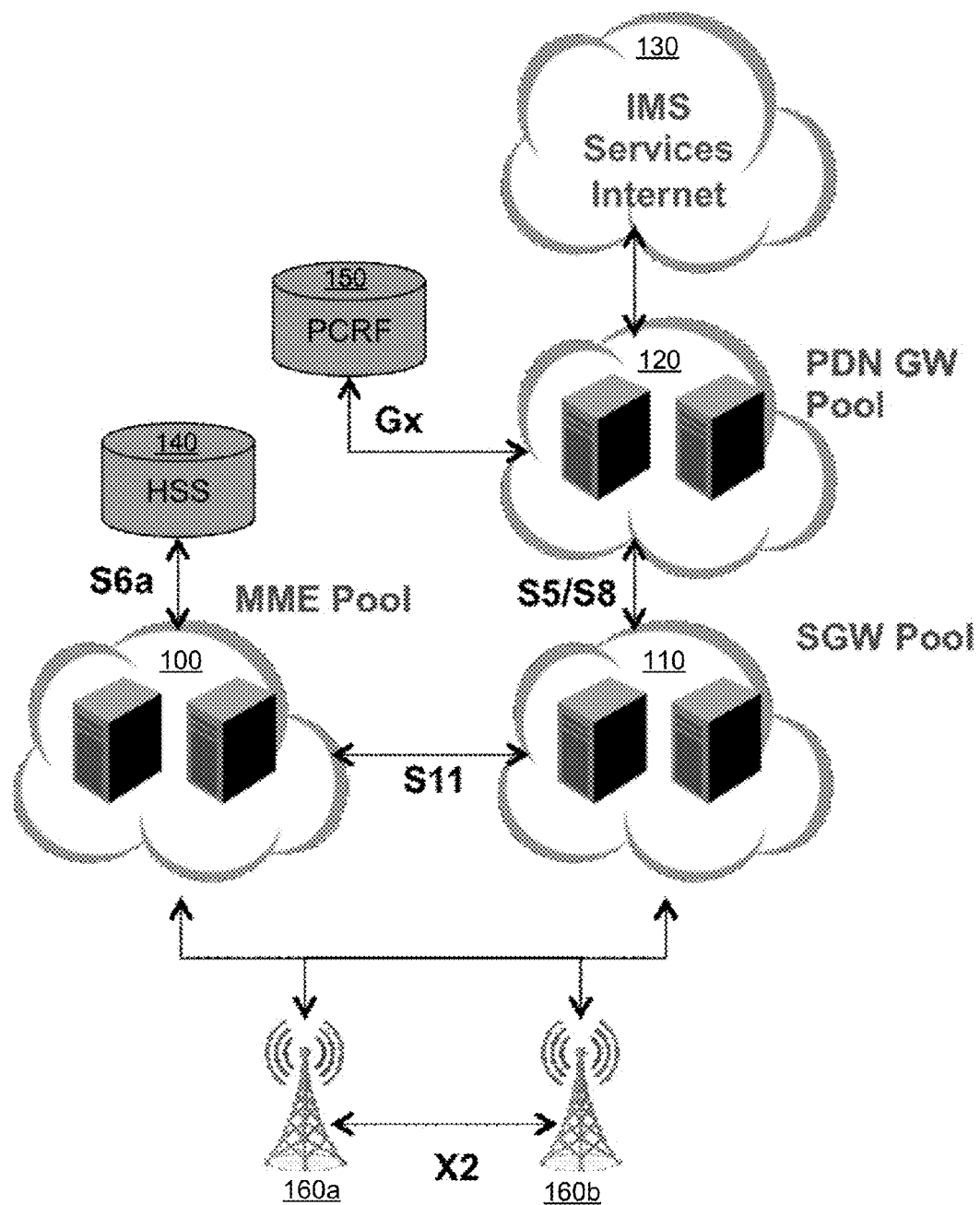
FIG. 1 is an exemplary LTE network architecture.

Moreover, the SN 200 also fully handles all micro-mobility events at a local enterprise gateway level with no signaling impact on the EPC (comprising, as illustrated in FIG. 1, e.g., an MME pool 100, an SGW pool 110, a PDN GW pool 120, IMS Services/Internet 130, HSS 140, and PCRF 150). To effectuate this functionality of the SN 200, an SN Mobility Entity (SME) is utilized to perform the aggregation of the S1-MME/S1-C and S1-U interfaces/connections. In accordance with one embodiment, each SN 200 will implement one or more SME instantiations. Each SME instantiation will present itself to the EPC as a virtual eNB 210 with a single S1-MME/S1-C and S1-U interface associated with it.

The SN 200 connects to the RNs 222a, 222b, and 222c through internal interfaces. These internal interfaces may be, for example, S1-MME/S1-C and S1-U interfaces, as in the case of MME and S-GW elements in the EPC connecting to eNBs, through S1 interfaces, although, as will be described subsequently in greater detail, certain scenarios may exist where one or more RNs may not have an internal interface established with an SME. These connections to the RNs 222a, 222b, and 222c typically run over IP security (IPSEC) tunnels.

As previously discussed, the SN functions as a local, premise-based gateway that anchors and aggregates a group of LTE RNs. In accordance with one embodiment, an RN is a full-featured UMTS nodeB. In accordance with another embodiment, an RN may implement complete LTE eNB functionality, ether as a standalone RN or as an RN integrated with UMTS to form a dual-standard radio. Considerations involved in determining this integration are availability of integrated baseband silicon and power consumption. For the purposes of this description of the present invention, it may be assumed that an RN is integrated with a UMTS subsystem into a single physical form factor.

Figure 3:
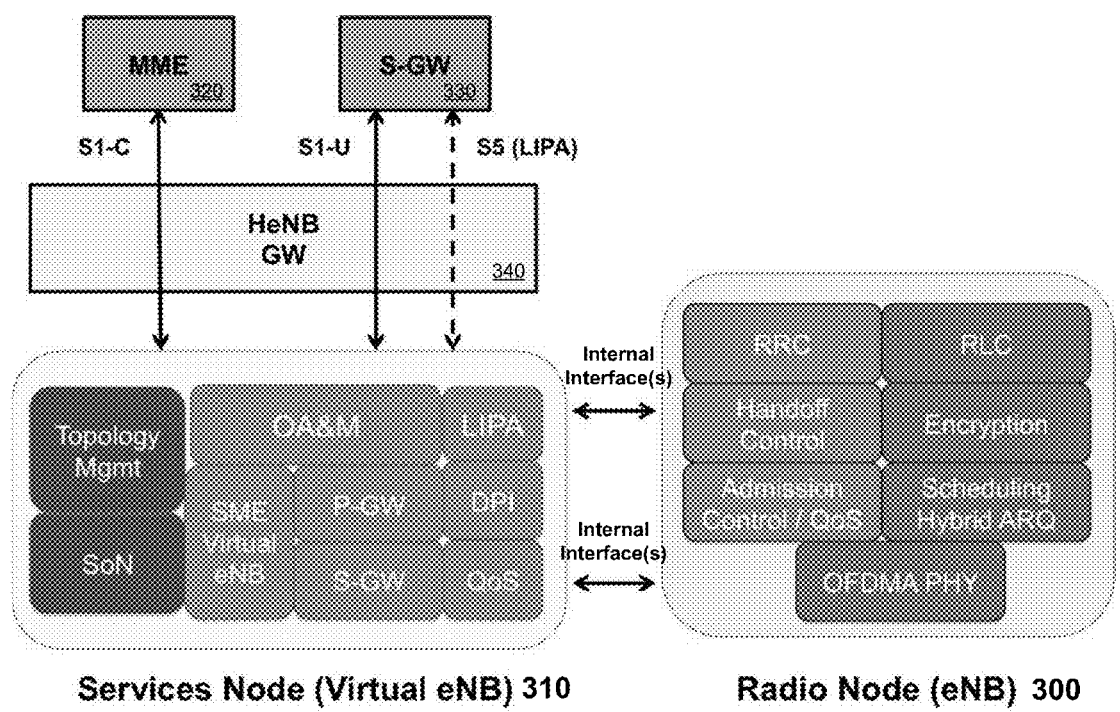
FIG. 3 is an exemplary LTE RN and LTE SN architecture in accordance with an embodiment of the present invention.

FIG. 3 illustrates that architecturally, an LTE RN/eNB 300 connects to an SN 310 through internal interfaces (e.g., S1-C/MME and S1-U), where the SN 310 is designed to be clustered to meet the needs of larger geographic deployments, and therefore, each RN 300 will implement a mechanism very similar to a flex mechanism to connect with multiple SNs. In turn, and as described previously, the SN 310 connects to an MME 320 and SGW 330 of the EPC with S1 interfaces via a Home eNB (HeNB) GW 340. An architecture of this nature yields multiple benefits, ranging from SN load balancing to redundancy and reliability. Additionally, and consistent with LTE network architecture, each RN will also run X2 interfaces, or alternatively X2-like interfaces, to neighboring RNs, where the X2/X2-like interfaces may be thought of as logical X2 interfaces allowing two RNs to be directly IP reachable, e.g., a logical tunnel may be constructed through parent SNs. It should be noted that the X2-like interfaces may be, alternatively to being run directly between RNs, routed via the SN 310.

A breakdown of the high-level software architecture within the RN 300 and the SN 310 is also illustrated in FIG. 3. The SN 310 may be made up of various elements/modules including, but not limited to, e.g., topology management, self-organizing network (SoN), the SME, operation, administration, and management (OAM), PDN GW/PGW, SGW, local IP access (LIPA), QoS, and deep packet inspection (DPI) functionality. The RN 300 may be comprised of various elements/modules including, but not limited to, e.g., radio resource control (RRC), radio link control (RLC), handoff control, admission control/QoS, encryption, scheduling hybrid automatic repeat/request, (ARQ), and orthogonal frequency division multiple access (OFDMA) physical (PHY) control. Alternative embodiments may employ more or less functionality/modules as necessitated by the particular scenario and/or architectural requirements. It should be noted that baseband silicon should become available to facilitate much of the physical layer processing through hardware accelerators, whereas much, if not all, of the MAC layer will be implemented in software on digital signal processor (DSP) and embedded processor fabrics. The RN 300 may have a unified radio resource management (RRM) module that combines the aforementioned admission control, handover control, coarser resource allocation through enhanced inter-cell interference coordination, etc. The QoS-aware airlink schedulers will be closely coupled to the RRM module and will be responsible for fine-grained airlink resource allocation. Alternatively, the radio resource management functionality may be implemented/embodied on the SN 310 instead of the RN 300.

Referring back to FIG. 2, a network architecture in which an LTE ERAN/local RAN is embedded in a macrocellular LTE network is illustrated. Again, the SN 200 connects back to the MME pool 100 in the EPC using internal interfaces (e.g., S1-MME/S1-C interfaces), and to the SGW pool 110 using internal interfaces (e.g., S1-U interfaces), much as an individual eNB 160a/106b would be connected. Additionally, all connections into the EPC may be established through a security gateway (Se GW) 230.

Presenting an SN and an entire group of RNs controlled by the SN as a single virtual eNB to the core network achieves at least two objectives/advantages over conventional systems. First, the complexity associated with aggregating and controlling a large number of RNs (performed by the SN) is hidden from the EPC. Hiding such complexity is particularly important as the number of enterprise small cells is likely to significantly exceed the number of LTE macrocellular eNB's, which drives the dimensioning of EPC equipment pools. Second, micro-mobility between individual RNs controlled by an SN is completely handled at a local enterprise gateway level, thus significantly reducing mobility-related signaling from impacting the MME pool in the EPC.

On the management plane, it is assumed that the SNs are provisioned through a TR-69/TR-196 interface from an access control system (ACS) entity in an operator core network. This is analogous to the provisioning architecture for UMTS ERAN and consumer femtocells, and is consistent with deployment roadmaps laid out by operators. In one embodiment, the attributes of the virtual eNB (SN) are directly provisioned by the ACS, while the attributes of the pool of radio nodes sitting behind it are managed by the SN. For other management plane integration such as events, alarms and performance data, custom integration may be carried out with vendors that install and manage operations support systems (OSSs) in operator networks. Alternatively, and in accordance with another embodiment, SNs, which take on the role of local enterprise gateways, may themselves be aggregated through an LTE femto gateway as also shown in FIG. 3.

From an operational perspective, the first procedure that a UE goes through upon being powered up is an attach procedure. Unlike conventional UMTS systems, the initial attach in accordance with various embodiments also results in the establishment of a default evolved packet system (EPS) bearer for "always-on" IP connectivity. This default EPS bearer is described in greater detail below.

Figure 4:
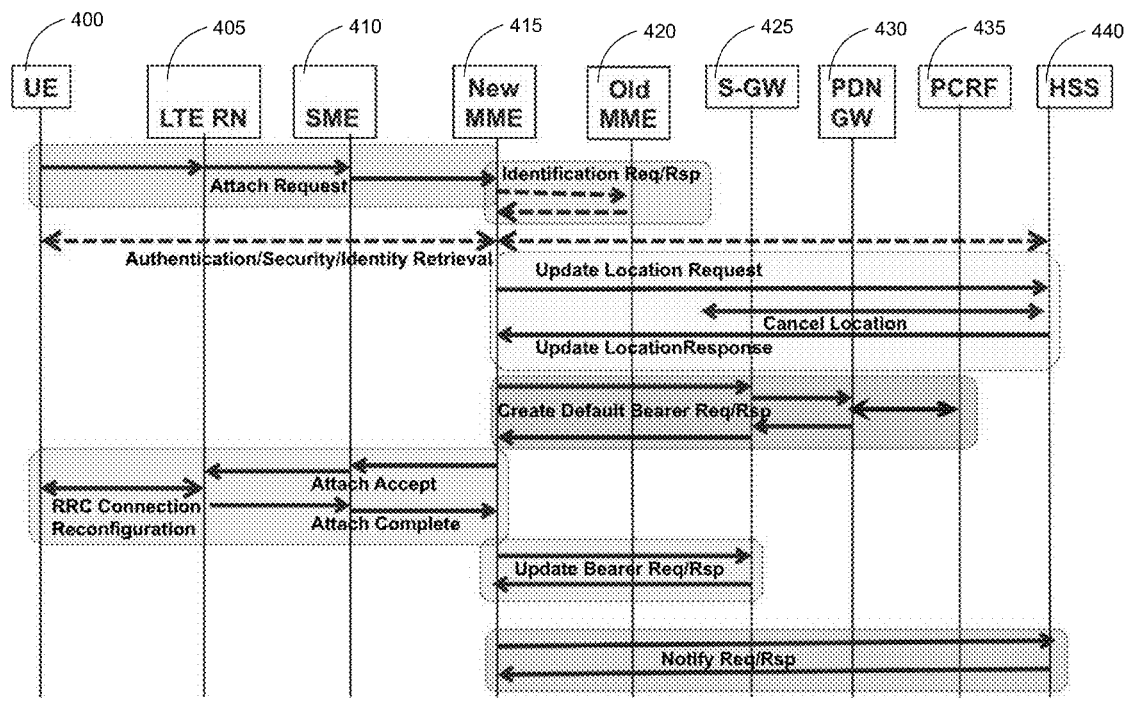
FIG. 4 is an exemplary message flow diagram illustrating UE attachment processes in a LTE local RAN in accordance with an embodiment of the present invention.

FIG. 4 illustrates the attach procedure for a UE 400 that is powering up in a local RAN/ERAN. The UE 400 sends an Attach Request message that contains the ID of the MME 420 with which it was previously attached, which is forwarded by the LTE RN 405 to the SME (virtual eNB) 410. The SME 410 forwards the Attach Request to either the old MME 420 or a new MME 415 depending on its IP connectivity. Upon an MME change, the new MME 415 retrieves the UE context from the old MME 420 and the ME identity from the HSS 440. The UE movement is captured in the HSS 440, and the old MME 420 is issued a Cancel Location message to clear the UE context.

The new MME 415 instructs a SGW 425 and PDN GW 430 to set up a default bearer, which is authorized by the PCRF entity 435. The radio bearer component of the default bearer is set up following communication between the MME and the SME 410, which in turn instructs the RN 405 to set up the radio bearer. The Attach Accept message is then sent over this default bearer. The MME then closes the loop by informing the SGW 425 of the eNB tunnel endpoint identifier (TEID) (Update Bearer Req/Rsp message), which is actually associated with the SME 410 on the SN to which the SME 410 belongs. Additionally, the new MME 415 exchanges Notify Req/Rsp messages with the HSS 440.

Figure 5:
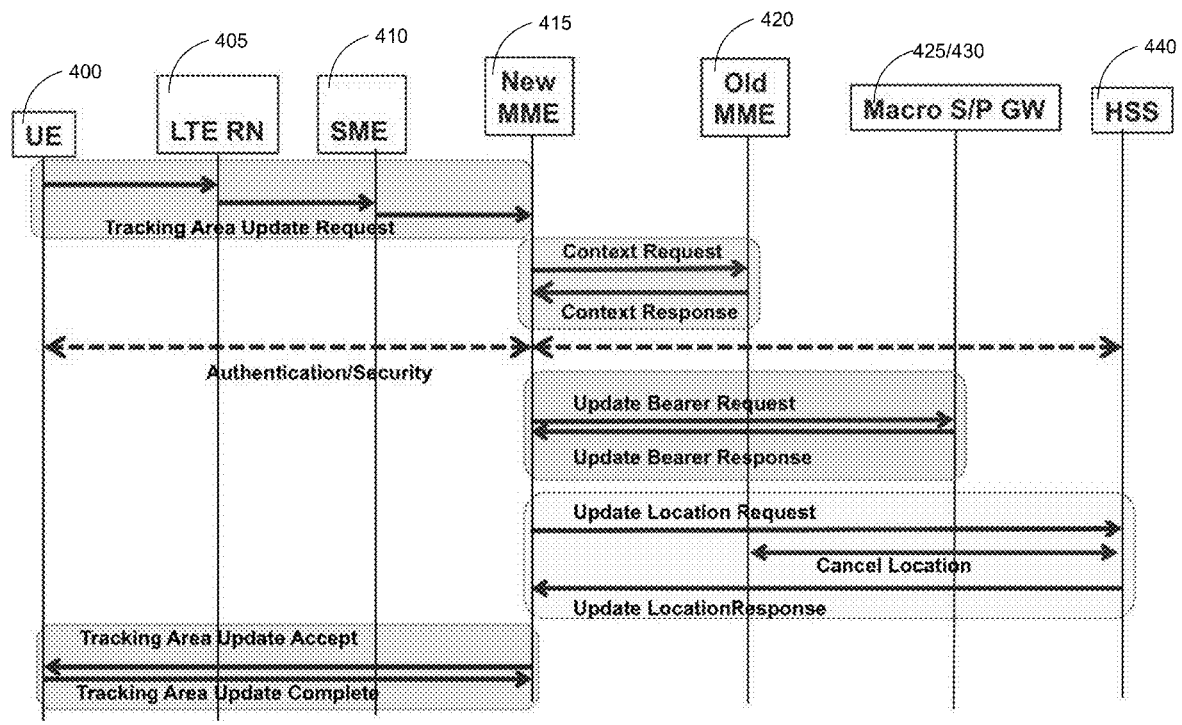
FIG. 5 is an exemplary message flow diagram illustrating tracking area update processes for a UE entering a LTE local RAN in accordance with an embodiment of the present invention.

A local RAN/ERAN deployment is expected to have one or more locally unique tracking areas that are distinct from that used in the surrounding macrocellular network. Therefore, when a UE enters the local RAN/ERAN, the UE will perform a tracking area update. The procedure by which this is carried out is illustrated in FIG. 5.

It should be noted that the SME 410 within an SN is required to relay a tracking area update request from the UE 400 to a selected/new MME 415 in the EPC as if it were a virtual eNB decoding this uplink message from the UE 400. This is typically required for the very first tracking area update as a UE migrates into a local RAN/ERAN. In this scenario, it may be assumed that the virtual eNB is associated with a different MME in the EPC MME pool than the MME used by the macro eNB, necessitating a context transfer (i.e., exchange of context req/rsp messages) from the old MME to the new MME. In reality, the MME pool in the EPC is likely to be densely inter-connected, i.e., the virtual eNB may have an S1 interface with the same MME that held the UE context before it migrated into the ERAN. Update Bearer Req/Rsp messages are exchanged between the new MME 415 and the Macrocellular/LTE SGW and PDN GW 425/430, while location of the UE 400 is updated as also described previously with reference to FIG. 4. Additionally, the tracking area update is accepted and completed between the UE 400 and the new MME 415.

Subsequent idle mode mobility events between RNs associated with an SME will not trigger any tracking area updates back to the EPC as these RNs will share a single tracking area. The SME will not necessarily be aware of the location of the UE down to a specific RN. However, upon a page from the network, the SME will page the UE across the entire set of RNs in order to reach the UE.

If a UE moves across the boundary between two RNs within an ERAN that have different tracking areas, the UE will issue a tracking area update. This will be relayed to the EPC through the appropriate SME, which the EPC will perceive as a different virtual cell within the ERAN from the previous virtual eNB/SME that the UE was associated with. Subsequently, this UE will be pageable through the new virtual eNB/SME.

In LTE, handovers are triggered by two specific measurement quantities, i.e., reference symbol received power (RSRP) and reference symbol received quality (RSRQ). These are analogous to pilot channel (PICH) received signal code power (RSCP) (signal strength) and Ec/Io (signal-to-noise ratio), respectively, and are measured using reference symbols inserted into (pilot) OFDMA symbols. In addition, the received signal strength (RSSI) on an entire carrier frequency is also used in making measurement decisions. Unlike conventional UMTS systems, inter-frequency LTE measurements and inter-radio access technology (RAT) measurements are carried out by a UE in discontinuous reception (DRX) cycles and scheduling gaps in the completely-packet-switched air-interface, and the use of compressed-mode mechanisms is not required. An LTE system in accordance with various embodiments of the present invention fully implements support for measurement gaps into the airlink schedulers both on the downlink and uplink in order to facilitate inter-frequency and inter-RAT measurements.

In general, a UE will only report the physical cell identifier (PCI) of the target cell whose measurements it makes since this can be determined easily at the physical layer without decoding the broadcast channels. Since the PCI does not fully disambiguate a cell, an eNB can request a UE to report the global cell ID of the target cell, a procedure requiring the UE to read the broadcast channel of the cell. The global cell ID identifies the cell uniquely and allows the source eNB to query the MME for the transport address of the X2 interface of the target eNB in case that connection is not nailed down statically.

Within a local RAN/ERAN in accordance with various embodiments, PCIs may be assigned automatically during an SoN phase, and X2 interfaces may nailed down statically. Therefore, querying global cell identifiers prior to handover is unnecessary. However, querying global cell identifiers to disambiguate PCIs may be required for handovers between the macrocellular network and a local enterprise ERAN, particularly in the inbound direction.

As described previously, LTE RNs will implement a flex-like mechanism allowing their association with multiple SMEs, each of which is a logical entity within an SN. A clustered solution will consist of multiple SNs, grouped logically together, potentially with multiple SMEs per SN.

When a UE moves between two RNs, there are two scenarios that may arise. In a default case, each of the RNs will be able to communicate with the logical SME that is responsible for that UE, and this is treated as an intra-SME handover, as will be described subsequently in greater detail. This type of handover is invisible to the EPC since the UE has not crossed the boundary of the virtual eNB that it is associated with, even though it has moved across the boundary separating two RNs associated with the SME.

In other possible scenarios, certain RNs may not have an internal interface to the SME that is currently associated with the UE. In this instance, mobility between two RNs will be handled through an SME change as will be described subsequently in greater detail, but with the UE continuing to be handled completely within the clustered ERAN. If the SME change is associated with a change in the virtual eNB, then this mobility event will be communicated to the MME pool in the EPC.

Figure 6:
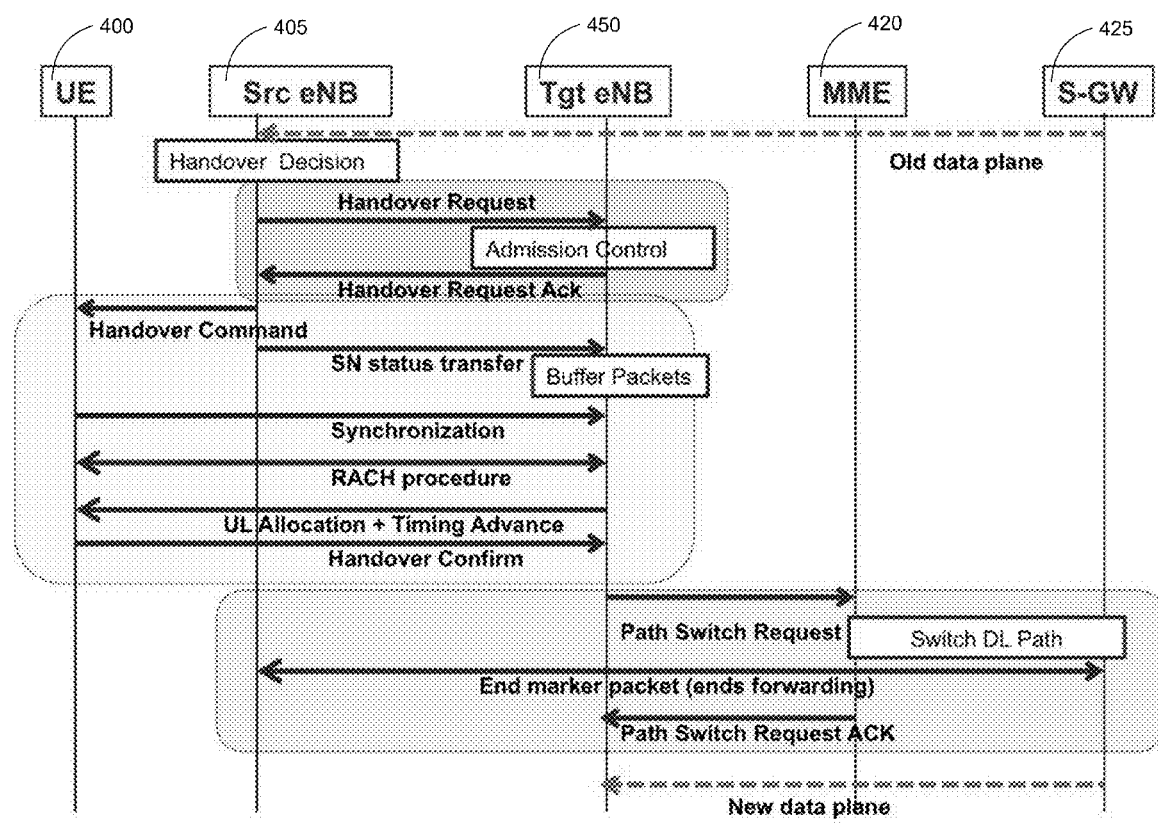
FIG. 6 is an exemplary message flow diagram illustrating an intra-MME handover in accordance with an embodiment of the present invention.

FIG. 6 is a general description of LTE handover, and in particular, illustrates processes performed to effectuate an intra-MME handover, which is initiated by a serving/source (Src) eNB (RN) 405 and is almost completely carried out over the X2 interface with a target eNB (RN) 450. The entire handover process may be triggered by measurement reports transmitted by the UE 400. Prior to this, measurement control messages are sent by an eNB through an RRC Connection Reconfiguration message. These messages contain parameters that define the quantities to be measured, along with reference thresholds for event-triggered messages. Additionally, these messages contain information about DRX cycles and measurement gaps.

The entire handover procedure may be thought of as having three phases: preparation; execution; and handover completion. As illustrated in FIG. 6, based on the UE 400 measurement reports, an Src eNB 405 decides to initiate handover to a target (Tgt) eNB 450. Alternatively, the Src eNB 405 may communication with the Tgt eNB 450 prior to any triggering measurement reports sent by the UE 400. That is, the Src eNB 405 and the Tgt eNB 450 may "anticipatorily" invoke a handover. The Src eNB 405 is responsible for determining which EPS bearers are going to be subject to forwarding to the Tgt eNB 450. The Src eNB 405 sends the Tgt eNB 450 a handover request message that contains UE 400 context information, including the EPS bearers and their QoS requirements, serving gateway endpoints, etc. The Tgt eNB 450 then performs admission control checks to determine if the QoS requirements of the EPS bearers may be met. Once it decides to accept the handover based on available resources and QoS requirements, the Tgt eNB 450 configures radio resources for the UE 400, and reserves a Cell RN Temporary Identifier (C-RNTI) and preamble slot to accelerate the random access channel (RACH) procedure. The Tgt eNB 450 then responds to the Src eNB 405 with a Handover Request Acknowledge message that includes a list of admitted EPS bearers and a transparent container that is intended for direct transmittal to the UE 400.

The Src eNB 405 transmits a handover command to the UE 400 that contains the identity of the Tgt eNB 450 as well as the transparent container received from that entity. The Src eNB 405 then starts forwarding user-plane packets to the Tgt eNB 450. At the same time, the UE 400 detaches in order to set up a connection with the Tgt eNB 450. To accomplish this, the UE 400 achieves synchronization and carries out a RACH procedure. A non-contention version of this procedure is facilitated by the RACH preamble reservation from the Tgt eNB 450, which expedites handover. Following a successful RACH procedure, which includes timing correction based on the UE's uplink RACH, the UE 400 is allocated air-interface resources on the uplink so that it may complete the handover by transmitting a Handover Confirm message.

The Tgt eNB 450 now needs to establish an S1 bearer to the SGW 425. This is initiated by sending a Path Switch Request to the MME 420. Since this is an intra-MME handover, this is the same MME 420 that was associated with the UE 400 when it was connected to the Src eNB 410. The MME 420 informs the SGW 445 to switch the user plane for the downlink data path to the Tgt eNB 450. The Src eNB 410 is also informed through an end-packet marker that it need not forward packets any longer to the Tgt eNB 450, and the UE 400 is now fully served by the Tgt eNB 450 through a direct EPS tunnel with the SGW 425.

Figure 7:
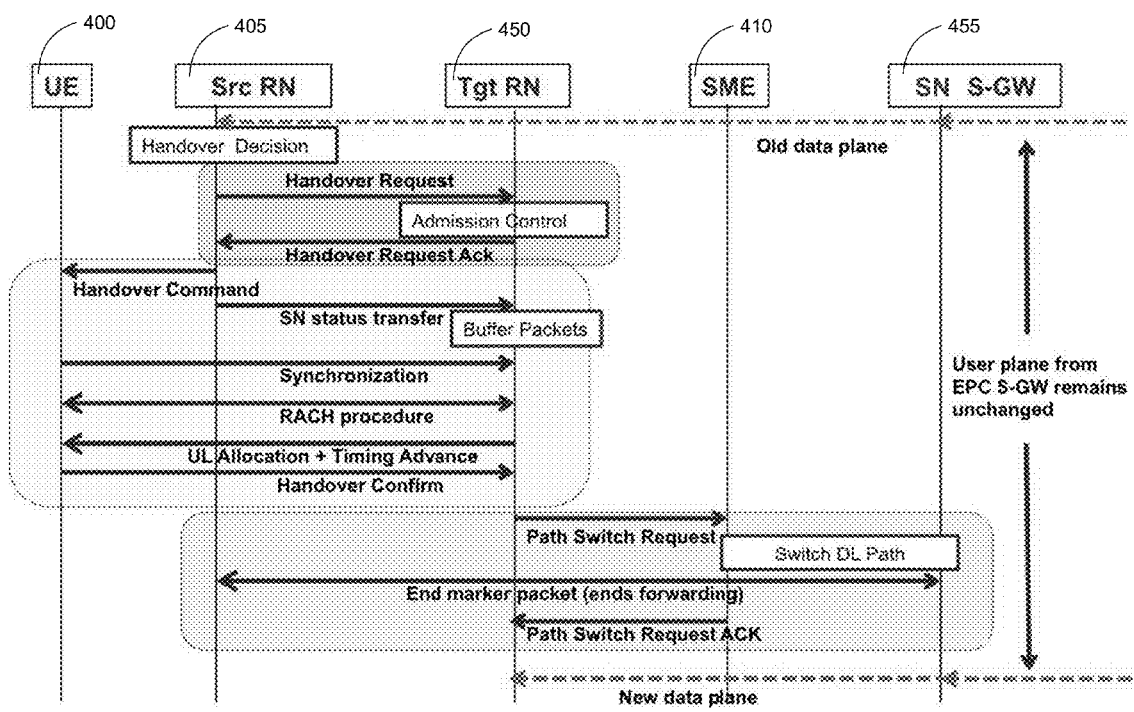
FIG. 7 is an exemplary message flow diagram illustrating handover processes within an LTE local RAN with no SME changes in accordance with an embodiment of the present invention.

FIG. 7 illustrates an exemplary intra-SME handover within a local RAN/ERAN, i.e., when no change in SME is involved. In such an intra-SME handover, the SME 410 and the SN SGW 455 replace, respectively, the MME 420 and the macro EPC SGW 425 illustrated in FIG. 6. The handover preparation and execution phases between the UE 400 and the source and target eNBs (RNs) can be accomplished exactly as they would be carried out in the macro LTE network, as discussed above, thus preserving standards compatibility. However, the handover completion phase deviates from the "template" procedure for intra-MME handover.

Since the goal is to fully suppress mobility events within the ERAN and handle them at the level of the local enterprise gateway SN, the SME 410 simply informs the SGW entity within the SN (SN SGW 455) of the mobility event, e.g., what type of handover is to occur/be invoked. The SN SGW 455 re-points the EPS bearer to a new Tgt eNB 450 with no change whatsoever made to the EPS bearer between the macro EPC SGW and the virtual eNB that is equivalent to the SN. With this procedure, the EPC is completely unaware of this micro-mobility event.

Such local micro-mobility handovers will be handled substantially more efficiently, and with improved performance due to the low/lower delay between the RNs and the SN within an enterprise network. In a more conventional architecture, Path Switch Request/Ack messages (exchanged between the Tgt RN 450 and the SME 410 as illustrated in FIG. 7) would have to be communicated out of the enterprise network (e.g., ERAN 220 illustrated in FIG. 2) to the EPC and back, adding delay to every handover event. However, and in accordance with various embodiments, no Path Switch Request needs to be transmitted to the EPC. The resulting reduction in handover delay, in addition to the signaling load reduction, achieved over the more conventional architectures are valuable advantages that accrue from the LTE architecture comprising a local enterprise gateway described in accordance with various embodiments herein.

As alluded to previously, in some relatively infrequent scenarios, a UE may perform a handover within a local RAN/ERAN between two RNs that may not have an internal interface established with the same SME. In such scenarios, an SME change is required to support this mobility event. It should be noted that a handover between two SMEs is equivalent to a handover between corresponding source and target virtual eNBs since each SME and the group of RNs associated with it are perceived as a single virtual eNB by the EPC.

Figure 8:
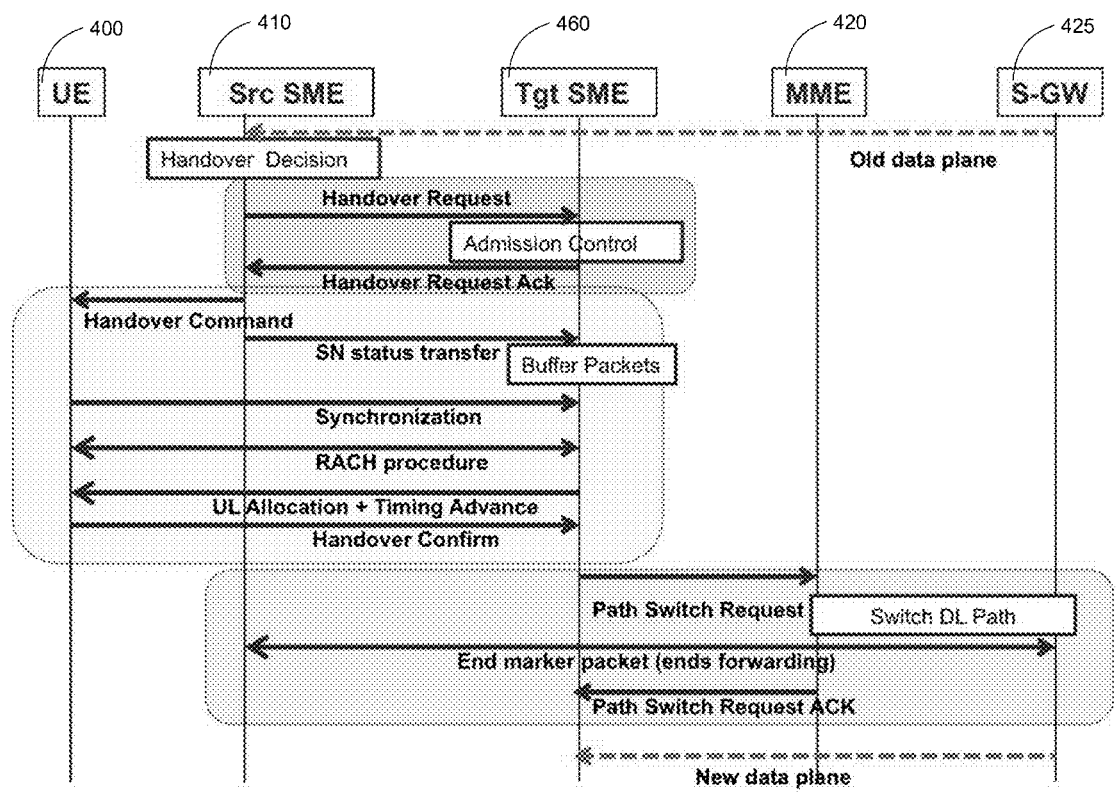
FIG. 8 is exemplary message flow diagram illustrating handover processes between two SMEs within an LTE local RAN in accordance with an embodiment of the present invention.

Assuming that the two SMEs within an ERAN have an S1 interface to the same MME, FIG. 6, which represents intra-MME handover, may be used as a reference. However as illustrated in FIG. 8, a "source SME" (Src SME 410) replaces the Src eNB 405 of FIG. 6, and a "target SME" (Tgt SME 460) replaces the Tgt eNB 450 of FIG. 6. That is, aside from the substitution of eNBs for SMEs, the message flow is the same as that illustrated in FIG. 6. It should be noted that in accordance with FIG. 8, each "SME" in actuality, represents the combination of the SME entity within the SN as well as the pertinent RN (eNB) that is involved in the handover. As discussed previously, this combination is viewed as a virtual eNB by the EPC.

An SME, i.e., the Src SME 410, upon realizing that it does not have an internal interface with a Tgt eNB, makes a decision to send a Handover Request directly to the Tgt SME 460, which has an internal interface to the intended Tgt eNB. In accordance with this procedure, certain assumptions are made. A first assumption to be made is that in a clustered LTE ERAN, the mapping of every RN and the set of SNs/SMEs associated with each RN are known to every entity in the cluster. A second assumption to be made is that there is full IP reachability between all SNs, although not necessarily between each RN and every SN. The Tgt SME 460 is responsible for initiating the Path Switch Request with the EPC. Under the assumption that this handover involves no change with either the MME 420 or the SGW 425, the EPC can handle this exactly as it does any handover between two macrocellular eNBs.

With regard to mobility in a heterogeneous LTE network that assumes that an LTE ERAN is embedded within a macrocellular LTE network, the two networks may be co-channel implemented, or the ERAN may be on a dedicated channel. It is assumed that measurement controls are configured appropriately, and inter-frequency measurements are facilitated as all handovers in LTE are of the "break-before-make" variety. Therefore, no distinctions will be made between these scenarios as described herein.

The LTE network architecture prescribes that UE handover between eNBs will exploit the X2 interfaces between them, and the EPC is only tangentially involved. An option to handover using the internal interface back to the EPC is also provided. Correspondingly, there are two options to facilitate handover between a local RAN/ERAN and a macrocellular network.

In a first scenario, X2 interfaces are established between the macrocellular eNBs and the ERAN. Because the ERAN cells are not directly exposed to the surrounding network, these X2 interfaces terminate on the local enterprise gateway SN, with internal interfaces running between the SN and the ERAN cells. These X2 interfaces may be established in a static manner between every macrocellular eNB and the ERAN SNs in the vicinity indexed by the global cell identifier of the ERAN cells. Alternatively, the macro MMEs maintain a mapping between global cell identifiers (IDs) for each ERAN cell and the transport layer address of the corresponding SN that hosts the SME responsible for proxying the X2 interface. The source eNB can query the MME for this transport address in order to dynamically establish an X2 interface as required for a handover.

It should be noted that enterprise metrocells are likely to be deployed in large numbers without close coordination with the macrocellular RAN. Therefore, the correspondence between global cell identifiers and transport layer addresses on the SN is likely to evolve and change over time. A framework is required to communicate local changes in an enterprise RAN back to the macrocellular RAN as well as the MME pool in the EPC. Such a framework may be referred to as "topology management." For example, information may be communicated between the SN and the MME pool in the EPC when a new RN is added under the control of the SN. The addition of the new RN results in the addition of a new global cell ID and a transport layer address mapped to the SN. Yet another example of when information may be communicated between the SN and the MME pool in the EPC is when an existing RN under the control of the SN is deleted. This deletion results in the deletion of the global cell ID/transport layer address mapping for the RN.

That is, and in particular, the SN may establish a relationship between the global cell ID and an IP address associated with an X2 interface, which, as described above, proxies the X2 interface on behalf of an RN/eNB, which is "hidden." This relationship can be communicated to an MME, and subsequently broadcast to other macro MMEs in the vicinity, so that as also described above, the macro MMEs may maintain the global cell IDs for each ERAN cell and the transport layer address of the corresponding host SN. In the above examples, where an RN may be added or deleted, the resulting change in physical cell ID, global cell ID, and X2 IP address is communicated to the MME as well. As well, if the physical cell ID of an RN changes for any reason, the change is communicated to the MME. Further still, if an RN is re-associated with a new SN in, e.g., a clustered deployment for load balancing, the corresponding physical cell ID, global cell ID, and X2 IP address changes are again, communicated to the MME.

In a second scenario, there may be no X2 interfaces established between ERANs and macrocellular networks. In this case, all handovers between these networks are S1-based and are facilitated by the EPC. The choice of which architecture to pursue will be based on vendor needs with respect to designing and building out a particular macrocellular LTE network.

Mobility in an intra-LTE context may involve a scenario where a UE is connected to an eNB in the macrocellular network, and is moving into a local RAN/ERAN. The UE will typically report the PCI of the target eNB it detects within the ERAN back to the macrocellular eNB. This PCI not likely be locally unique within the footprint of that macrocell as there may be multiple ERAN deployments in the area, each with a large number of RNs. Therefore, as mentioned previously with regard to triggering LTE handovers, in order to disambiguate the target, the macro eNB will request the UE to report the global cell ID corresponding to the PCI it listed in the measurement report. The UE will have to read the broadcast channel of the detected ERAN cell and report the requested global cell ID. Once the global cell ID has been obtained, the appropriate X2 interface is determined or established in order to effectuate an X2-based handover. This is the central task for the topology management framework discussed previously.

If X2 interfaces are available between the macro eNB and the ERAN, the global cell identifier is used to identify the appropriate interface to initiate the handover. This can be done either with static X2 interfaces or dynamic X2 interfaces as described previously. In the event that X2 interfaces are not available, an internal interface-based handover is triggered using the global cell ID of the target ERAN eNB that was determined by the UE. It should be noted that outbound mobility (handover to the macrocellular network from a local RAN/ERAN) is the converse of the inbound mobility described, where a UE is connected to an eNB in the macrocellular network, and is moving into a local RAN/ERAN. It should also be noted that such outbound mobility is a "simpler" process in that PCI disambiguation is generally not an issue.

As to inter-RAT mobility, it is assumed that the ERAN will have ubiquitous coverage on either UMTS or LTE RATs. Although there may be little motivation to effect an inter-RAT handover for coverage reasons, load balancing considerations, QoS requirements of a UE, etc. may provide reasons for ensuring the UE is served by certain RATs. As such, an SN in accordance with various embodiments will be configured to have close linkages between UMTS and LTE subsystems. Additionally, an SN in accordance with various embodiments will have the ability to preferentially redirect LTE-capable mobile terminals to the LTE RAT if they attach or enter the ERAN through the UMTS RAT.

It is anticipated that these inter-RAT handovers will be executed through the EPC so that the location of the UE on the appropriate RAT is registered on the appropriate core network. If a local RAN/ERAN is deployed in an ambient 3G/GSM environment with no external macrocellular LTE cells, UEs will detect the presence of these networks through inter-RAT measurements facilitated by scheduled gaps in airlink transmissions. These inter-RAT measurements are communicated back to the serving RN, which relays them back to the SME entity on the SN. When the SME decides to trigger an inter-RAT handover, the mechanism of choice is to use the MME/SGSN Gn interface. Therefore, existing mechanisms in the EPC will be fully leveraged in such a scenario.

Figure 9:
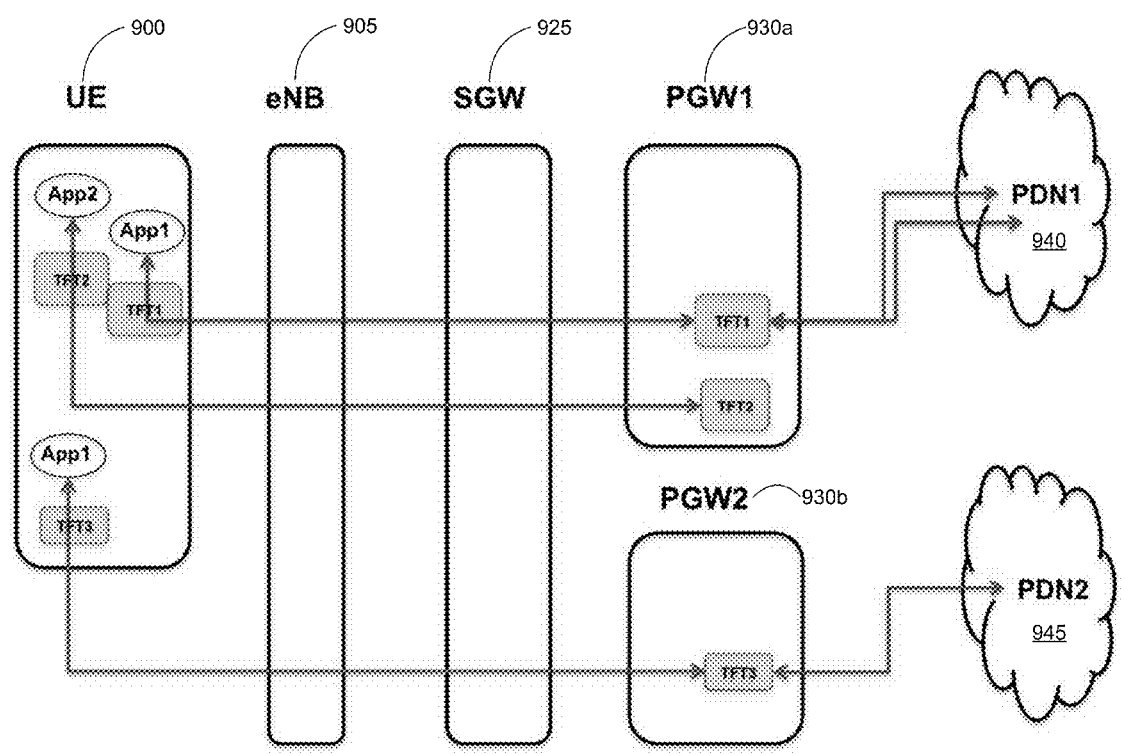
FIG. 9 is an exemplary LTE EPS bearer framework illustrating connections between UEs and multiple PDNs in accordance with one embodiment.

With respect to the establishment and handling of the userplane, both in a pass-through and locally switched context, and in general, the EPC provides IP connectivity to the UE for both voice and data services. This IP connectivity is typically provided to a well-identified PDN, which could generally refer to, e.g., the Internet. More specific operator services like voice, IMS, etc., will map to multiple service data flows (SDFs) and will, in general, require multiple bearers to be set up, connecting to distinct PDN's. Typically, distinct connections may be established between a UE and multiple PDNs as shown in FIG. 9 which illustrates an exemplary LTE EPS bearer framework in accordance with one embodiment.

The framework that ties IP connectivity and QoS to the radio air-interface is called an EPS bearer. The EPS bearer is a logical transport channel that connects a UE to a PDN and is associated with a set of QoS parameters. These QoS attributes such as delay and loss tolerances, scheduling policy, etc. are applied mostly at the air-interface, which is the bottlenecked link, but may also determine IP ToS markings on the IP transport layer.

All the traffic that is part of an EPS bearer is subject to the same QoS attributes. To be more precise, an EPS bearer is an aggregation of service data flows that receive a QoS treatment in the aggregate. That is, the EPS bearer uniquely identifies traffic flow that receives a common QoS treatment between a UE and PDN/PDN GW. In the event that multiple IP flows associated with a UE need distinct QoS treatment (VoIP and data for example), those flows need to be mapped to distinct EPS bearers. For illustration, the two EPS bearers that are established between PGW1 930*a* (PDN GW) and the UE in FIG. 9 will have been set up as distinct bearers since they have their own unique QoS requirements, even though they are servicing data flows directed to and from the same PDN. That is, FIG. 9 shows a UE 900, where the UE 900 may have certain applications that generate/are associated with application traffic, e.g., App1 and App2, both being associated with traffic to PGW1 930*a*/PDN 1 940, and App1 that has application traffic generated between the UE 900 and PGW2 930*b*/PDN2 945. Moreover, a traffic flow template (TFT) refers to a set of all packet filters associated with a particular EPS bearer as also illustrated in FIG. 9.

Figure 10:
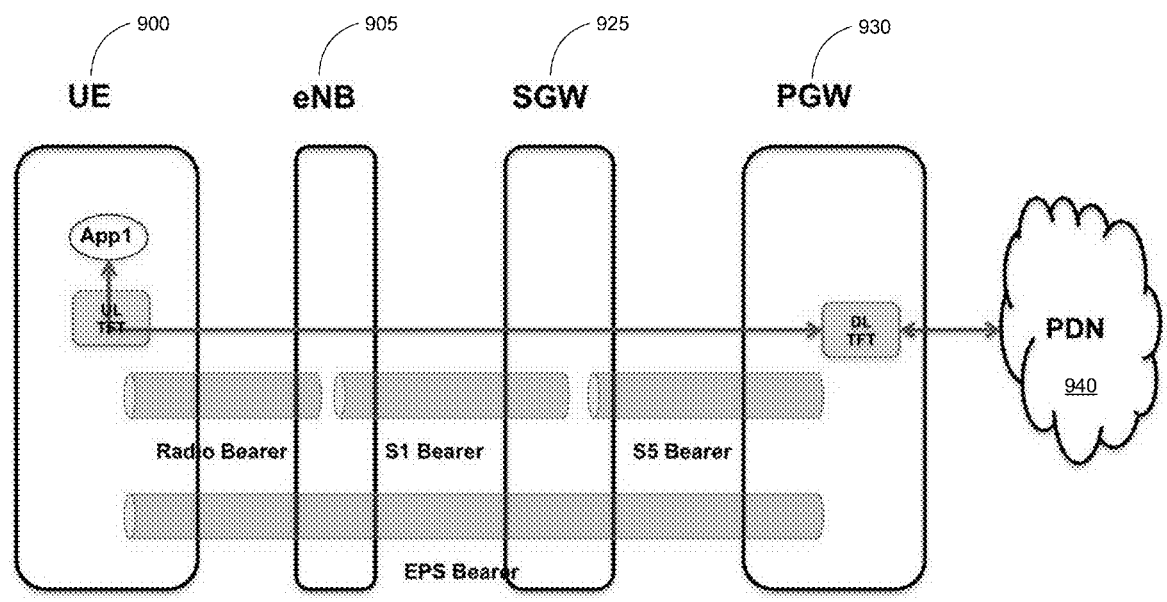
FIG. 10 illustrates exemplary EPS bearer details in accordance with one embodiment.

An EPS bearer is composed of a radio bearer, an S1 bearer, and an S5 bearer as illustrated in FIG. 10. The radio bearer is established between the UE 900 and the eNB 905, and the S1 bearer is set up between the eNB 905 and the SGW 925, while the S5 bearer is between the SGW 925 and the PGW (PDN GW) 930. The S1 and S5 bearers carry the EPS bearer traffic encapsulated in a General Packet Radio Service (GPRS) Tunneling Protocol (GTP) tunnel.

Each EPS bearer is associated with a set of downlink (DL) and uplink (UL) packet filters, i.e., the TFTs. These filters are employed at the endpoints of the EPS bearer, the PGW 930 (DL) and the UE 900 (UL) to identify a service data flow and map it to the appropriate EPS bearer as shown in FIG. 10.

QoS also plays a fundamental role in LTE since there is no concept of a circuit-switched service. Voice, for instance, is treated as a data service with strict delay, loss and bit-rate requirements. In the EPS bearer framework, there are two kinds of EPS bearers in terms of the supported data-rates. Guaranteed Bit Rate (GBR) bearers guarantee a minimum rate end-to-end, with the radio bearer coming under particular focus to meet this requirement. The first step in the establishment of GBR bearers is a Radio Admission Control (RAC) check to ensure that sufficient resources are available in a target cell to meet the requirements of the GBR bearer. For example, an SN may utilize RAC check at the time of initial handover into, e.g., a local RAN/ERAN. In particular, the SN may check not only the particular cell being handed into, but neighboring cells as well for their associated resources. The RAC check may reject a resource allocation request if it is likely that further handovers within the local RAN/ERAN could fail due to existing resource limitations even if an initial handover would succeed. After the bearer has been established, the onus to guarantee the bit rate falls upon the airlink scheduler, which must meet this requirement independent of radio conditions. Future evolutions of the GBR bearer in LTE will permit the concept of a maximum bit-rate greater than the guaranteed value to better support rate-adaptive codecs.

In contrast, non-Guaranteed Bit Rate (non-GBR) bearers do not support any minimum rate guarantees and RAC checks are optional. Non-GBR bearers are policed in an aggregate sense rather than on a per-bearer basis. They are typically intended to carry service data flows corresponding to web browsing, email, etc.

EPS bearers can also be divided into default and dedicated bearers on the basis of the functionality they provide. As will subsequently be described in greater detail, default bearers are established as soon as a UE attaches to a network to facilitate the "always-on" user experience.

In a framework that is considerably simpler than UMTS-era GPRS networks, there are only two QoS attributes associated with an EPS bearer: the Quality Class Identifier (QCI); and the Allocation and Retention Priority (ARP). The ARP is used at the time of bearer establishment for admission control purposes. Typically, this admission control decision involves an estimation of the airlink resources needed for GBR bearers and the ARP value may be used for admission or rejection of a bearer, or to drop an existing bearer in favor of a preemption-capable bearer with a higher ARP priority value. The ARP plays no role in user-plane handling once the bearer establishment has been completed.

On the other hand, the QCI determines the user-plane behavior of packets on the corresponding EPS bearer, especially on the bottleneck radio bearer. The QCI is a class-based entity that is a pointer to a set of parameters like scheduling weights, queuing thresholds, HARQ configuration, etc. that are selected to achieve desired QoS characteristics. As shown in Table 1, a set of QCI values have been standardized to ensure that an eNB from any vendor will deliver the same QoS characteristics. In the near-term it is anticipated that QCI=1 for conversational voice (VoIP) and QCI=5 for IMS signaling are the most critical QCIs to support.

TABLE 1

Standardized QCI Characteristics

| QCI | Resource Type | Priority | Packet Delay Budget | Packet Error Loss Rate | Example Services |
|---|---|---|---|---|---|
| 1 | GBR | 2 | 100 ms | 10-2 | Conversational Voice |
| 2 | | 4 | 150 ms | 10-3 | Live Video Streaming |
| 3 | | 3 | 50 ms | 10-3 | Real-time gaming |
| 4 | | 5 | 300 ms | 10-6 | Buffered Video Streaming |
| 5 | Non-GBR | 1 | 100 ms | 10-6 | IMS Signaling |
| 6 | | 6 | 300 ms | 10-6 | Video, TCP-based interactive |
| 7 | | 7 | 100 ms | 10-3 | Video, interactive gaming |
| 8 | | 8 | 300 ms | 10-6 | Similar to 6, lower priority |
| 9 | | 9 | 300 ms | 10-6 | Similar to 6, lower priority |

In LTE systems, a default EPS bearer is established for a UE, along with an IP address, to facilitate an always-on user experience. Unlike UMTS systems, the default EPS bearer remains nailed up even when the mobile terminal is in LTE_IDLE state. This default EPS bearer typically takes on the character of a best-effort traffic class, and is mapped to a non-GBR bearer. The default EPS bearer is also typically associated with the "internet" PDN and remains activate during the lifetime of the connection.

In an LTE architecture architected in accordance with various embodiments, a UE powering up or performing an initial Tracking Area update in the ERAN is associated with the MME in the EPC pool that was selected by an SME within the SN as detailed previously. Correspondingly, default bearer establishment still occurs within the macro network EPC in the SGW and PGW pools. The MME in the EPC is responsible for establishing this default bearer and the S1 bearer component is established between the EPC SGW and the virtual eNB through which the SN represents the ERAN to the EPC. The main purpose of this procedure is to ensure that the UE has a default IP address and a bearer assigned by the core, preserving its always-on experience in a seamless manner should it migrate out of the ERAN. As described previously and as illustrated in FIG. 4, the default bearer is established during the initial UE attach procedure.

In addition to the default bearer, additional bearers may be activated for a UE in order to provide QoS differentiation to particular traffic flows. These additional bearers may provide transport to the same PDN as the default bearer, or could connect the UE to other PDNs. An example of a dedicated bearer would be one that supported voice over IP services that would require specific bit-rate and delay guarantees. FIG. 9 illustrates the notion of multiple EPS bearers established between the UE and the PDN GW (PGW).

In order to correctly identify IP flows and map them to the right bearers, the UE and the PDN GW need packet filters that are part of the aforementioned TFTs. They typically contain attributes such as IP addresses, protocol type, port information IP ToS information, etc. Each EPS bearer is associated with a distinct TFT and different aspects of the context for the bearer need to be present in virtually all network entities such as the eNB, MME, SGW and the PDN GW.

Figure 11:
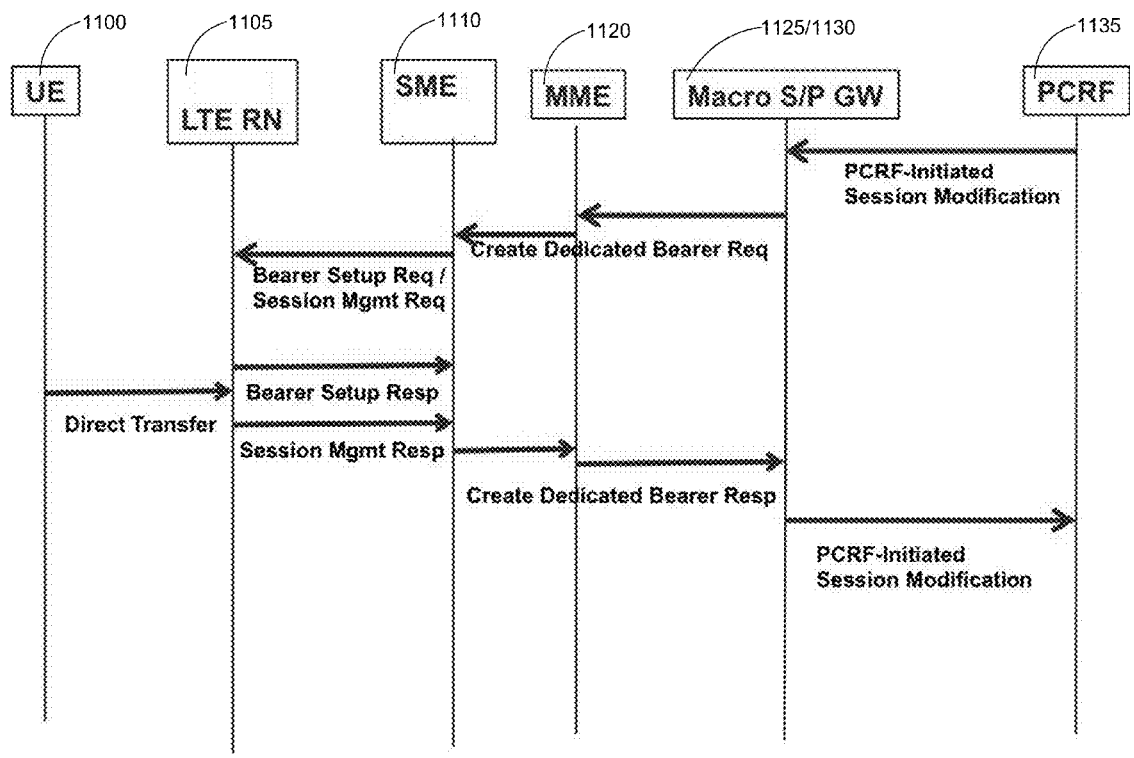
FIG. 11 is an exemplary message flow diagram illustrating dedicated bearer establishment for UE in an LTE local RAN in accordance with an embodiment of the present invention.

FIG. 11 illustrates exemplary processes for establishing a dedicated bearer for a UE in a local RAN/ERAN. A PCRF 1135 sends a PCRF-initiated session modification message to the macrocellular SGW and PDW 1125/1135. The macrocellular SGW/PDW 1125/1135 in turn transmit a Create Dedicated Bearer Request (which includes, e.g., the QoS and TFT to be used in the UE) to the SME 1110 via the MME 1120. Bearer Setup Req and Session Management Req messages are sent to the LTE RN 1105 (eNB) after the SME 1110 has built a set of session management configuration information. For the attach procedure, the UE 1100 sends the LTE RN 1105 a direct transfer message, which contains the attach complete message (i.e., Bearer Setup/Session Management Responses). The SME 1110 forwards along with Create Dedicated Bearer Response to the macrocellular SGW/PGS 1125/1135, and the PCRF-Initiated Session Modification messages to confirm the dedicated bearer has been correctly set up.

Recalling that a UE may connect to multiple PDNs with independent IP connections, for each PDN connection, and typically for a distinct Access Point Name (APN), the MME is involved in selecting a PDN GW for that connection. The APN is the primary quantity used in this selection process, and is either obtained from the UE or from the subscriber record stored within the HSS. Additionally, in Release 10 and beyond, LIPA/Selected IP Traffic Offload (SIPTO) support is configured as a per-APN attribute, and is considered in the PDN GW selection. In order to support load balancing between PDN GWs, the MME uses DNS interrogation to receive a list of PDN GWs for a given APN, along with weight factors for each PDN GW. The HSS may be provisioned with a PDN GW for each APN, and this information is accessible by the MME during the initial attach procedure. If for some reason, the MME selects a different PDN GW (load balancing, co-location with the S-GW, etc.), it updates the MME with the new PDN GW identity for that user. Similarly, if the UE has an existing PDN GW on a different radio access technology, such as UMTS, the HSS should contain information about that current PDN GW, which will be utilized by the MME for bearer establishment.

Figure 12:
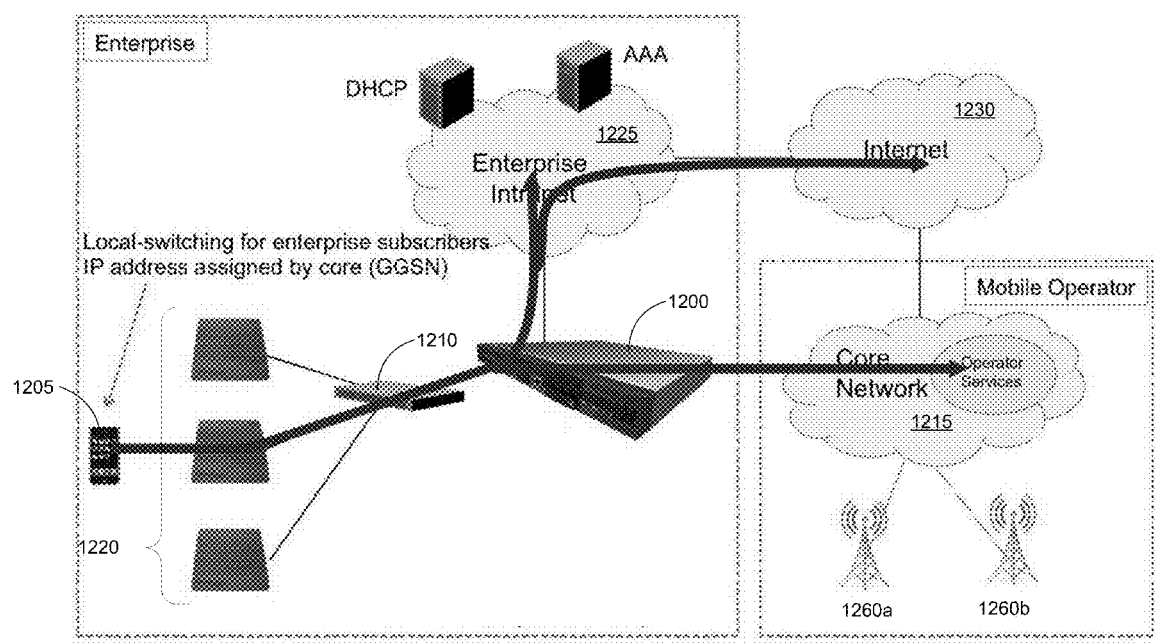
FIG. 12 is an exemplary local data offload architecture in accordance with an embodiment of the present invention.

An advantage of the ERAN architecture described in accordance with various embodiments of the present invention, lies is the ability to offload data locally at the enterprise gateway based on a set of policies configured into the SN. FIG. 12 illustrates this framework, where traffic can be locally offloaded at the SN based on user identity, traffic type, IP flow, etc.

As shown in FIG. 12, some traffic is passed through to the core network 1215 for operator services, some traffic destined for the Internet 1230 is also passed through to the core network 1215 (for example, guest users) whereas other traffic, likely from authorized enterprise users, is locally switched into the enterprise intranet 1225 or directly to the Internet 1230 through a local ISP connection. The SN in accordance with various embodiments, is configured for functionality, including, but not limited to DHCP proxy functionality, NAT (Core IP to Enterprise IP) functionality, ARP proxy functionality, and PDP snooping (IMSI, APN) functionality. Additionally, local switching for enterprise subscribers (1205) through the ERAN 1220 and SME 1210 is provided using IP addresses assigned by the Enterprise core network (GGSN).

Referring back to FIG. 10, and in the LTE user-plane architecture, TFTs are stored at the EPS bearer end-points, namely the UE for the uplink and the PDN GW for the DL. These TFTs are employed to map IP flows into EPS bearers along with the QoS markings Therefore, in order to perform local switching while preserving QoS attributes and consistency of mappings between IP flows and EPS bearers, it is essential to inherit the TFTs at the SN. In accordance with one embodiment, inheriting the TFTs is achieved by implementing the PDN GW functionality within the SN and have it participate in bearer establishment for all traffic that does not require to be passed through to the Operator core network/EPC.

3GPP is in the process of standardizing the concept of a local gateway (L-GW) in Release 10 specifications and beyond that aims to harmonize the requirements for LIPA and local data offload at the home or enterprise level with QoS control centralized in the core network. At the same time, in order to ensure that legacy UEs can also benefit from local data offload, the LIPA architecture is APN-based. The 3GPP LIPA architecture will be integrated into the LTE ERAN architecture described herein in accordance with various embodiments in order to facilitate local data offload that is directionally aligned with 3GPP evolution. Specifically, the SN will implement a new function referred to as the Local Gateway (LGW) that may be thought of as a lightweight version of a SGW/PDN GW combination. This will also require a new S5 interface to the SGW within the EPC.

In the initial release of the LIPA specifications, a second default EPS bearer is introduced. This LIPA default bearer is typically established with the intention of anchoring the bearer at the LGW and offloading traffic locally in addition to the original default EPS bearer, which is anchored in the PDN GW in the EPC. It should be noted that QoS parameters, if any, for the LIPA default EPS bearer are stored in the HSS. Thus, a mechanism is provided to import these parameters into the SN from the HSS, which is situated in the Operator EPC. Additionally, an option may be provided to locally offload the primary default EPS bearer as well as any LIPA EPS bearers. The advantage of this approach is that it is not contingent on support for multiple APNs within the UE and should work seamlessly for existing UEs.

As described previously, at the time of bearer establishment, the MME is responsible for PDN GW selection. In 3GPP Release 10 and beyond, the concept of a PDN GW is expanded to include the aforementioned LGWs that are responsible for local data offload at the home or enterprise level. In the 3GPP LIPA framework, the HeNB provides the IP address of the LGW to the MME. Instead of a DNS query, the MME then selects the LGW as the PDN GW for this APN and the corresponding EPS bearer. LIPA is established by the UE seeking to initiate a new PDN connection to an APN that is permitted for LIPA. Every initial UE message and uplink NAS transport control message communicated by the LTE ERAN/virtual eNB contains the IP address of the LGW function that is co-located on the SN in accordance with various embodiments.

The MME will return a correlation ID to the SN/virtual eNB as part of the EUTRAN Radio Access Bearers (RAB) bearer establishment. This facilitates correspondence between the radio bearer and the LIPA EPS bearer that is locally offloaded at the LGW.

Moreover and because the entire ERAN is presented to the EPC as a single virtual eNB, micro-mobility between the ERAN cells should not have any impact on the LIPA EPS bearers. However, when a UE migrates out of the ERAN, the LIPA PDN connection needs to be torn down. This decision is taken by the SME, which embodies the virtual eNB to the EPC. The correspondence between RABs established on the virtual eNB and the LIPA EPS bearer is known because of the correlation ID originally sent by the MME.

Figure 13:
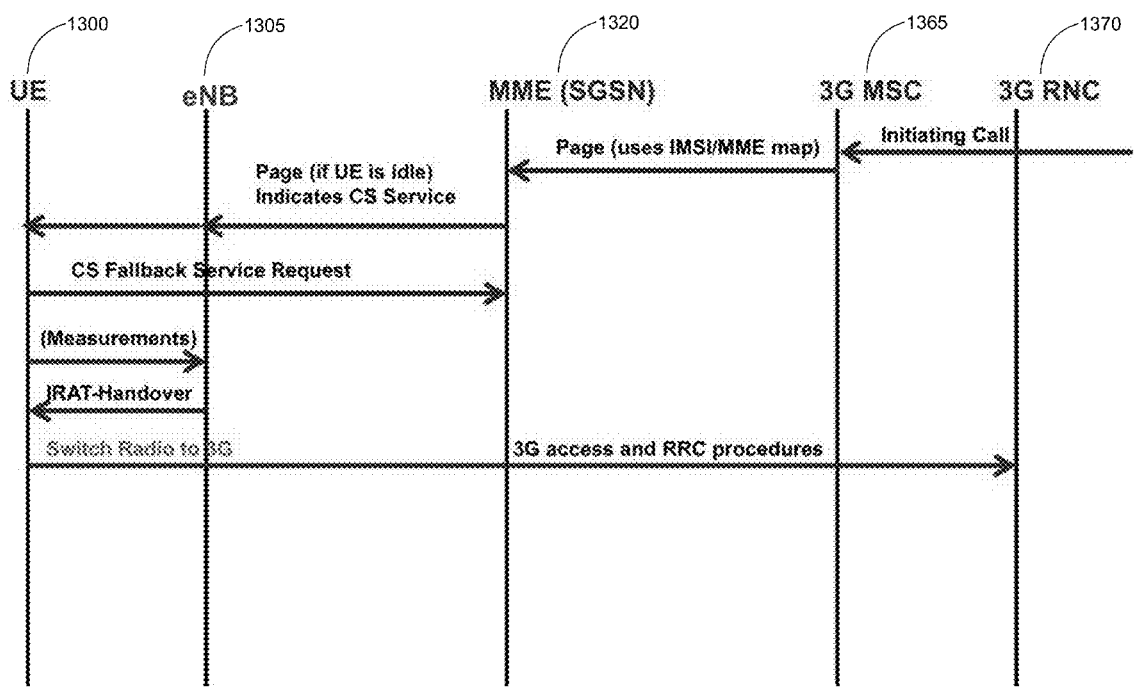
FIG. 13 is an exemplary message flow diagram illustrating CS fallback preparation phase processes in accordance with an embodiment of the present invention.

Regarding the execution phase, FIG. 13 illustrates CS Fallback in the case of a mobile terminated call. Pursuant to an incoming call, the MSC 1365 will forward the call to the MME 1320, which it perceives as an SGSN. If the UE 1300 is in active state, the MME 1320 sends a message directly informing the UE 1300 about the incoming call. If the UE 1300 is in idle mode, the MME 1320 pages the UE 1300 through the eNB 1305. In the case of an LTE ERAN in accordance with various embodiments, the eNB is replaced by a virtual eNB/SME that is part of the SN.

While various embodiments of the present invention have been described above for an LTE system, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method of implementing a local radio access network (RAN), comprising:
    aggregating, with an aggregation node, communications interfaces between a plurality of radio nodes and a packet core network through the aggregation node, each respective one of the plurality of radio nodes communicatively coupled to the aggregation node and to user equipment (UE) devices associated with the respective one of the plurality of radio nodes;
    controlling, with the aggregation node, mobility of the UE devices associated with the plurality of radio nodes; and
    acting, with the aggregation node, as a virtual enhanced NodeB (eNB) to the packet core network, thereby hiding the aggregated communications interfaces from the packet core network, wherein the virtual enhanced eNB is connected to the packet core network via a single user plane interface and a single control plane interface.

2. The method of claim 1, wherein the aggregation node comprises an enterprise services node (SN) including at least an SN mobility entity.

3. The method of claim 2 further comprising, determining whether to perform at least one of the following:
    a handover of one of the UE devices between two radio nodes of the plurality of radio nodes, wherein the two radio nodes are connected, either to the same SN mobility entity, or to a target SN mobility entity and a source SN mobility entity, respectively;
    a handover of the one of the UE devices between a radio node of the plurality of radio nodes and a macrocellular eNB radio node; and
    paging of the one of the UE devices across all of the plurality of radio nodes during idle mode mobility events.

4. The method of claim 3, wherein the handover of the one of the UE devices between the target SN mobility entity and the source SN mobility entity is effectuated by the source SN mobility entity sending a handover request to the target SN mobility entity, the target SN mobility entity having an internal interface with an intended target radio node served by the target SN mobility entity.

5. The method of claim 2 further comprising, offloading data locally based upon policies configured into the enterprise SN, the offloading of the data locally being effectuated by inheriting at the enterprise SN, traffic flow templates associated with a particular evolved packet system bearer while preserving quality of service attributes, the inheriting of the traffic flow templates comprising one of:
    implementing packet data network gateway functionality within the enterprise SN such that the enterprise SN participates in bearer establishment for all traffic not needing to pass through to the packet core network; and
    implementing a 3rd Generation Partnership Project local gateway function, and establishing a second default bearer anchored at the local gateway function for offloading traffic locally.

6. The method of claim 1, wherein handover of the UE devices between a target radio node and a source radio node occurs at a level within the aggregation node without transmitting a Path Switch Request message to a mobility management entity of the packet core network.

7. The method of claim 1, wherein handovers are performed relying upon X2 interfaces established between at least one of the plurality of radio nodes served by the virtual eNB and at least one eNB of a macrocellular network, the virtual eNB acting as a relay and forwarding control and user plane traffic to the at least one of the plurality of radio nodes.

8. The method of claim 7 further comprising, establishing a relationship between a global cell identifier of the at least one of the plurality of radio nodes and an Internet Protocol (IP) address associated with one of the X2 interfaces between an enterprise services node (SN) mobility entity of the aggregation node to which the at least one of the plurality of radio nodes is attached, wherein the IP address is proxied by the aggregation node on behalf of the at least one of the plurality of radio nodes, and wherein the relationship is communicated to at least one mobility management entity of the packet core network.

9. The method of claim 8 further comprising, communicating any change to at least one of a physical cell address of the at least one of the plurality of radio nodes, the global cell identifier of the at least one of the plurality of radio nodes, and the IP address associated with the one of the X2 interfaces of the SN mobility entity to the at least one mobility management entity of the packet core network.

10. The method of claim 9, wherein the at least one of the plurality of radio nodes is one of a newly added radio node, a deleted radio node, or a re-associated radio node.

11. The method of claim 1, further comprising determining via radio admission control check, resource status of at least one of the plurality of radio nodes during initial handover into the at least one of the plurality of radio nodes as well as neighboring radio nodes resource status, the determining of the resource status of the at least one of the plurality of radio nodes and the neighboring radio nodes resource status being performed by either the one of the plurality of radio nodes or the aggregation node.

12. The method of claim 1, wherein the controlling of the mobility of the UE devices associated with the plurality of radio nodes comprises anticipatorily invoking a handover from a first radio node of the plurality of radio nodes to a second radio node of the plurality of radio nodes.

13. A computer program product, embodied on a non-transitory computer-readable medium, comprising:
    computer code for causing an aggregation node to aggregate communications interfaces between a plurality of radio nodes and a packet core network through the aggregation node, each respective one of the plurality of radio nodes communicatively coupled to the aggregation node and to user equipment (UE) devices associated with the respective one of the plurality of radio nodes;
    computer code for causing the aggregation node to control mobility of the UE devices associated with the plurality of radio nodes; and
    computer code for causing the aggregation node to act as a virtual enhanced NodeB (eNB) to the packet core network, thereby hiding the aggregated communications interfaces from the packet core network, wherein the virtual enhanced eNB is connected to the packet core network via a single user plane interface and a single control plane interface.

14. A system, comprising:
    a local radio access network (RAN) comprising a plurality of radio nodes; and
    a packet core network communicatively connected to the plurality of radio nodes via a service node (SN) comprising at least an SN mobility entity, the SN being configured to:
        aggregate communications interfaces between the plurality of radio nodes and the packet core network, each respective one of the plurality of radio nodes communicatively coupled to the aggregation node and to user equipment (UE) devices associated with the respective one of the plurality of radio nodes;
        control mobility of the UE devices associated with at least one of the plurality of radio nodes; and
        act as a virtual enhanced NodeB (eNB) to the packet core network, thereby hiding the aggregated communications interfaces from the packet core network, wherein the virtual enhanced eNB is connected to the packet core network via a single user plane interface and a single control plane interface.

15. The system of claim 14, wherein a source SN mobility entity determines whether to perform at least one of the following:
    a handover of one of the UE devices between two radio nodes of the plurality of radio nodes, wherein the two radio nodes are connected, either to the same SN mobility entity, or to a target SN mobility entity and a source SN mobility entity, respectively;
    a handover of the one of the UE devices between a radio node of the plurality of radio nodes and a macrocellular eNB radio node; and
    paging of the one of the UE devices across all of the plurality of radio nodes during idle mode mobility events.

16. The system of claim 14, wherein handover of one of the UE devices between a target radio node and a source radio node occurs at a level within the SN without transmitting a Path Switch Request message to the packet core network.

17. The system of claim 16, wherein the handover of the UE devices between the target SN mobility entity and the source SN mobility entity is effectuated by the source SN mobility entity sending a handover request to the target SN mobility entity, the target SN mobility entity having an internal interface with an intended target radio node served by the target SN mobility entity.

18. The system of claim 14, wherein policies configured in the SN provide for offloading data locally, the offloading of the data locally being effectuated by inheriting at the SN, traffic flow templates associated with a particular evolved packet system bearer while preserving quality of service attributes, the inheriting of the traffic flow templates comprising one of:
    implementing packet data network gateway functionality within the SN such that the SN participates in bearer establishment for all traffic not needing to pass through to the packet core network; and
    implementing a 3rd Generation Partnership Project local gateway function, and establishing a second default bearer anchored at the local gateway function for offloading traffic locally.

19. The system of claim 14, wherein handovers are performed relying upon X2 interfaces served by the virtual eNB established between at least one of the plurality of radio nodes and at least one eNB of a macrocellular network, the virtual eNB acting as a relay and forwarding control and user plane traffic to the at least one of the plurality of radio nodes.

20. The system of claim 19, wherein the SN establishes a relationship between a global cell identifier of the at least one of the plurality of radio nodes and an Internet Protocol (IP) address associated with one of the X2 interfaces between an enterprise services node (SN) mobility entity of an aggregation node to which the at least one of the plurality of radio nodes is attached, wherein the IP address is proxied by the SN on behalf of the at least one of the radio nodes, and wherein the relationship is communicated to at least one mobility management entity of the packet core network.

21. The system of claim 20, wherein the SN communicates any change to at least one of a physical cell address of the at least one of the plurality of radio nodes, the global cell identifier of the at least one of the plurality of radio nodes, and the IP address associated with the one of the X2 interfaces of the SN mobility entity to the at least one mobility management entity of the packet core network.

22. The system of claim 21, wherein the at least one of the plurality of radio nodes is one of a newly added radio node, a deleted radio node, or a re-associated radio node.

23. The system of claim 14, wherein either the SN or at least one of the plurality of radio nodes determines, via radio admission control check, resource status of the at least one of the plurality of radio nodes during initial handover into the at least one of the plurality of radio nodes as well as neighboring radio nodes resource status.

24. The system of claim 14, wherein the SN mobility entity controls the mobility of the UE devices associated with the plurality of radio nodes by anticipatorily invoking a handover from a first radio node of the plurality of radio nodes to a second radio node of the plurality of radio nodes.

* * * * *